United States Patent
Cho

(10) Patent No.: US 7,203,771 B2
(45) Date of Patent: Apr. 10, 2007

(54) APPARATUS, METHOD AND COMPUTER-READABLE MEDIUM FOR SUPPLYING A SIGNAL BASED ON A USER INPUT TO EITHER A TOUCH PAD OR AN OPTICAL DEVICE

(75) Inventor: Kang-seok Cho, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 164 days.

(21) Appl. No.: 10/624,607

(22) Filed: Jul. 23, 2003

(65) Prior Publication Data

US 2004/0066420 A1 Apr. 8, 2004

(30) Foreign Application Priority Data

Sep. 3, 2002 (KR) ............... 2002-52885
Dec. 5, 2002 (KR) ............... 10-2002-0077063

(51) Int. Cl.
*G06F 3/00* (2006.01)

(52) U.S. Cl. ............... 710/5; 710/14; 710/33; 713/324

(58) Field of Classification Search .......... 710/5, 710/8, 14, 33, 59; 712/405; 713/1, 2, 100, 713/324
See application file for complete search history.

(56) References Cited

U.S. PATENT DOCUMENTS

| | | | |
|---|---|---|---|
| 5,815,471 A | | 9/1998 | Mince et al. |
| 6,006,285 A | * | 12/1999 | Jacobs et al. ............ 710/14 |
| 6,279,056 B1 | * | 8/2001 | Jacobs et al. ............ 710/48 |
| 6,412,075 B1 | * | 6/2002 | Klein ............ 713/322 |
| 6,414,675 B1 | * | 7/2002 | Shen ............ 345/211 |
| 6,763,400 B2 | * | 7/2004 | Numano et al. ............ 710/14 |
| 6,792,480 B2 | * | 9/2004 | Chaiken et al. ............ 710/14 |
| 6,865,621 B2 | * | 3/2005 | Iwata ............ 710/20 |
| 6,868,460 B1 | * | 3/2005 | Kou ............ 710/36 |
| 2001/0043191 A1 | | 11/2001 | Lindsey |

FOREIGN PATENT DOCUMENTS

| | | | |
|---|---|---|---|
| JP | 09320251 A | * | 12/1997 |
| JP | 10-341036 | | 12/1998 |
| JP | 2000-035836 | | 2/2000 |

(Continued)

*Primary Examiner*—Kim Huynh
*Assistant Examiner*—Eron Sorrell
(74) *Attorney, Agent, or Firm*—Staas & Halsey LLP

(57) ABSTRACT

A portable computer provided with a power switch, a drive for an optical device, an audio signal processing unit processing the audio data of a disk inserted into the optical device drive, and an inputting unit formed with a plurality of selection buttons for inputting movement and selection of a pointing cursor. Each selection button of the inputting unit has a selection inputting function in response to a plurality of operations of the optical device drive. The audio signal processing unit is supplied with assistant power while system power is turned off. The audio signal processing unit controls the optical device drive based on selection by the selection button as inputted. With this configuration, the present invention provides a portable computer wherein an inputting unit, for movement and selection of the pointing cursor when the optical device drive is operated while the power switch is turned off, can be utilized as a control button involved in reproduction of the optical device drive.

21 Claims, 3 Drawing Sheets

FOREIGN PATENT DOCUMENTS

| | | |
|---|---|---|
| KR | 2000-26285 | 5/2000 |
| KR | 2001-46646 | 6/2001 |
| KR | 2002-7798 | 1/2002 |
| KR | 2002-14323 | 2/2002 |
| WO | WO 01/02949 A1 | 1/2001 |

* cited by examiner

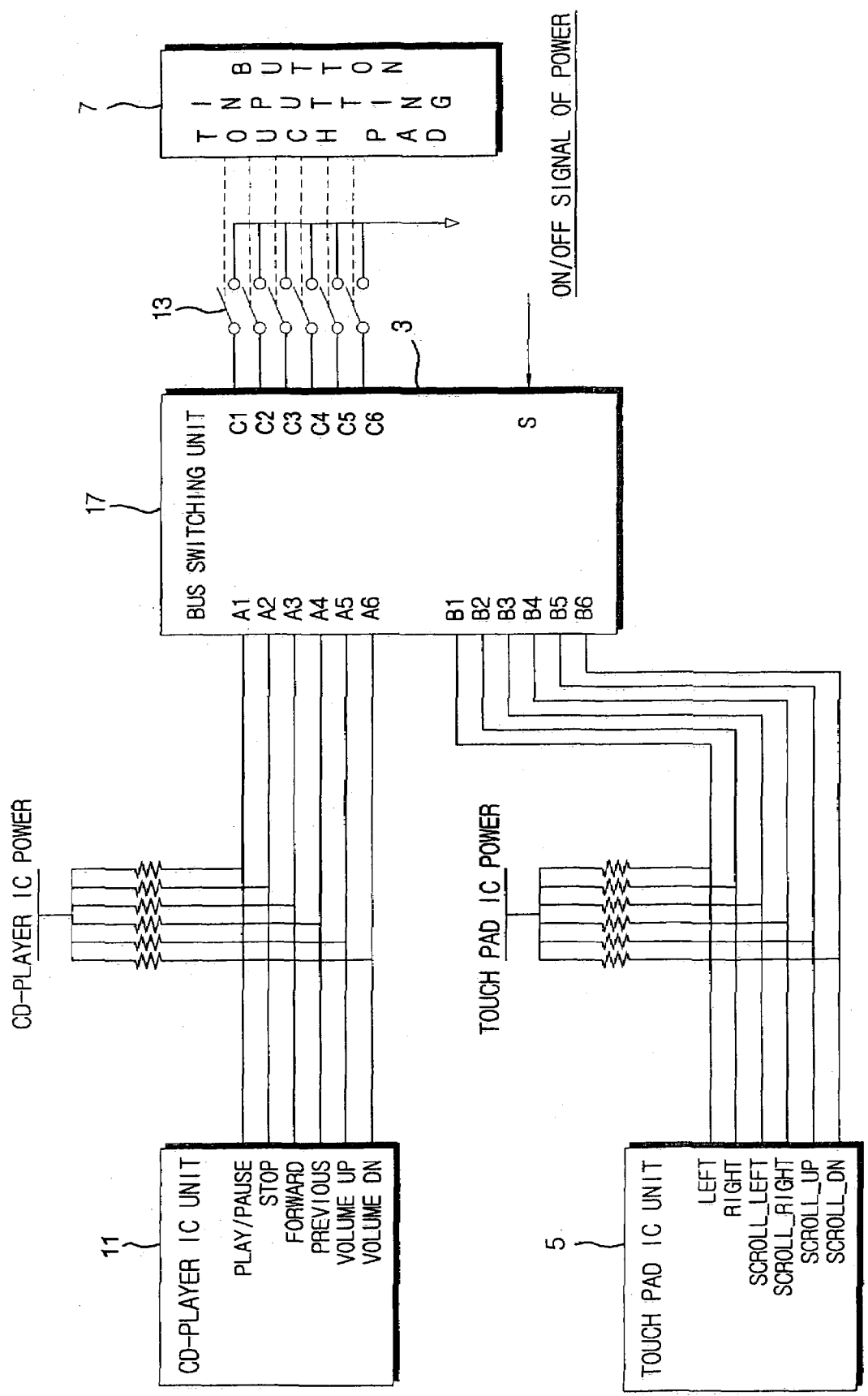

APPARATUS, METHOD AND COMPUTER-READABLE MEDIUM FOR SUPPLYING A SIGNAL BASED ON A USER INPUT TO EITHER A TOUCH PAD OR AN OPTICAL DEVICE

CROSS-REFERENCE TO RELATED APPLICATIONS

This application claims the benefit of Korean Patent Application No. 2002-77063, filed Dec. 5, 2002, in the Korean Intellectual Property Office, and Korean Patent Application No. 2002-52885, filed Sep. 3, 2002, in the Korean Intellectual Property Office, the disclosures of which are incorporated herein by reference.

BACKGROUND OF THE INVENTION

1. Field of the Invention

The present invention relates, in general, to a computer system, and more particularly, to a computer system wherein optical devices such as a CD-ROM drive can be driven even while a power switch of the computer system is turned off.

2. Description of the Related Art

Generally, a portable computer comprises a central processing unit (CPU) having operation and control functions, a storage device such as a hard disk drive and a CD-ROM drive and so on, an inputting device such as a touch pad for inputting a mouse pointing, a video chip for processing a video signal, a sound chip for processing an audio signal, a system body on which a main board provided with chip sets controlling data input/output and exchange between the devices is mounted, and an LCD unit coupled to the system body by a hinge, displaying the video signal supplied from the video chip in the form of images.

With the use of a computer equipped with a CD-ROM drive, a typical example of the optical devices, a user can listen to music that he desires to hear, as if he hears the music through an audio system exclusive of the musical listening.

However, in order to listen to music with the use of the portable computer, a power switch (not shown) is selected and the computer system is booted up, thereby allowing the audio data processed in the sound chip to be outputted as the sound.

In this regard, there has been developed a reproduction system wherein an audio file of a disk inserted into the CD-ROM drive can be reproduced even while the portable computer is not in operation. On this system is mounted a separate CD player IC (integrated circuit). On one lateral plane of the system body are provided an auxiliary power switch for supplying the power to the CD player IC and inputting buttons such as PLAY, STOP, BACK, FORWARD, etc., involved in audio reproduction, for controlling the CD player IC. Here, when an inputting button involved in the audio reproduction is selected, the selected signal is inputted through a pin to input a control signal of the CD player IC.

However, with regard to a portable computer whose volume has been reduced as much as possible, considering its portability, it is not reasonable to separately provide inputting buttons involved in the audio production, in terms of the efficiency in utilizing the space.

SUMMARY OF THE INVENTION

Accordingly, it is an aspect of the present invention to provide a portable computer wherein an inputting unit for movement and selection of a pointing cursor can be utilized as a control button involved in audio reproduction of a CD-ROM drive as an optical device when the optical device is driven while the power switch is turned off.

Additional aspects and/or advantages of the present invention will be set forth in part in the description that follows and, in part, will be obvious form the description, or may be learned by practicing the present invention.

The foregoing and/or other aspects of the present invention are achieved by providing a portable computer provided with a power switch, a drive for an optical device, an audio signal processing unit processing the audio data of a disk inserted into the optical device drive, and an inputting unit formed with a plurality of selection buttons for inputting movement and selection of a pointing cursor, wherein each selection button of the inputting unit is established to have a selection inputting function in response to a plurality of operations of the optical device drive, and the audio signal processing unit is supplied with assistant power, which is independent of system power, while system power is turned off and controls the optical device drive based on selection by the selection button as inputted.

According to an aspect of the invention, the inputting unit comprises a plurality of inputting buttons for inputting movement and selection of the pointing cursor, a plurality of inputting button switches generating selection signals when the respective inputting buttons are pressed, and a touch pad provided with a touch pad IC unit generating a pointing signal in response to the selection signal as generated in the plurality of inputting button switches.

According to an aspect of the invention, the computer further comprises a bus switching unit supplying the selection signal as generated in the inputting button switches based on the "ON or OFF" signal of the power switch into either of the touch pad IC unit or the audio signal processing unit.

According to an aspect of the invention, the bus switching unit supplies the selection signal as generated in the inputting button switches based on the "ON" signal of the power switch to the touch pad IC unit.

According to an aspect of the invention, the bus switching unit supplies the selection signal as generated in the inputting button switches based on the "OFF" signal of the power switch to the audio signal processing unit.

According to an aspect of the invention, the computer further comprises a microcomputer to turn on or off power supplied to the touch pad IC unit based on the "ON or OFF" signal of the power switch.

According to an aspect of the invention, the microcomputer supplies the assistant power to the audio signal processing unit when the selection signal is generate d by pressing the inputting button while the system power is turned off.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 3 is a switch circuit diagram to use a touch pad inputting button of FIG. 1 as an inputting button involved in reproduction of the CD-ROM drive.

DETAILED DESCRIPTION OF THE PREFERRED EMBODIMENTS

Figure 1:
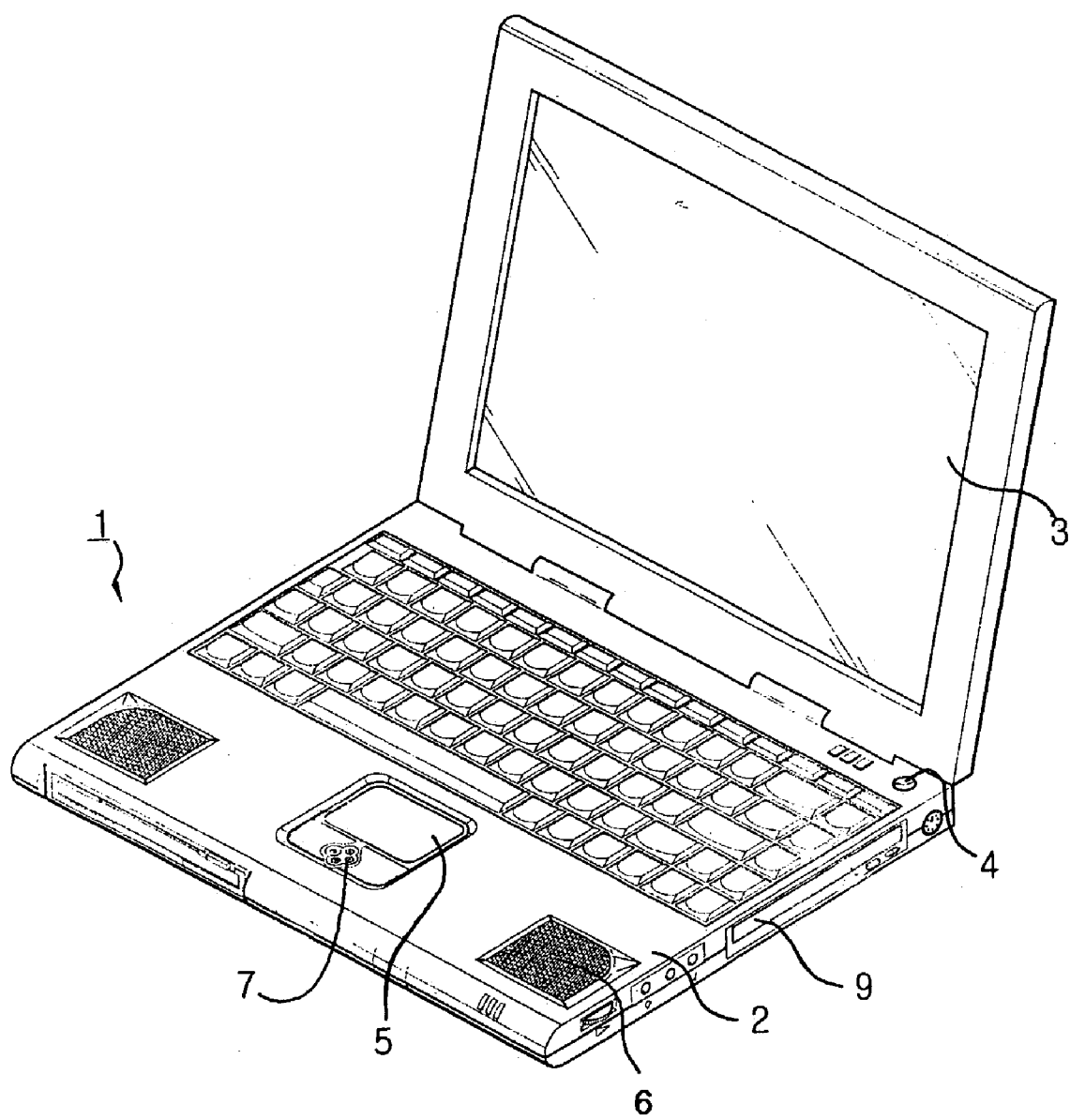
FIG. 1 is a perspective view of a portable computer according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 shows an external appearance of a portable computer according to an embodiment of the present invention, equipped with a CD-ROM drive capable of being operated while the power switch is turned off. As shown therein, the portable computer 1 comprises a computer body 2 on which a central processing unit, a main board and a CD-ROM drive, etc., all of which are not shown, are mounted, and an LCD unit 3 coupled to the computer body 2 by a hinge, displaying images thereon. On one side of the computer body 2 is provided a power switch 4 for operating the computer system. A touch pad 5 is provided on the planar face of the computer body 2, sensing a contact position of a user's finger and generating a pointing signal as sensed.

The touch pad 5 includes a sensing plate for sensing a contact position of a user's finger, a controller recognizing the pointing position based on the signal sensed by the sensing plate, and a plurality of touch pad inputting buttons 7 for scrolling a pointing cursor vertically and horizontally and inputting a selection by the pointing cursor.

A CD player IC unit 11 to be described later is inherently built within the portable computer, as an audio signal processing unit controlling a reproduction function of the CD-ROM drive 9 with the power supplied separately from the power for driving the computer system. If a touch pad inputting button 7 is selected while the power switch 4 is turned off, that is, the system power is in an "OFF" state, power is supplied to the CD player IC unit 11. And then, the CD player IC unit 11 processes the audio data contained in the disk inserted into the CD-ROM drive 9 and outputs the processed data through a speaker 6.

The touch pad inputting buttons 7 according to the present invention are used as inputting buttons for manipulation of the pointing cursor while the system power is turned on, but they function as inputting buttons for selecting a volume control and a reproduction of the CD-ROM drive 9 while the system power is turned off.

Figure 2:
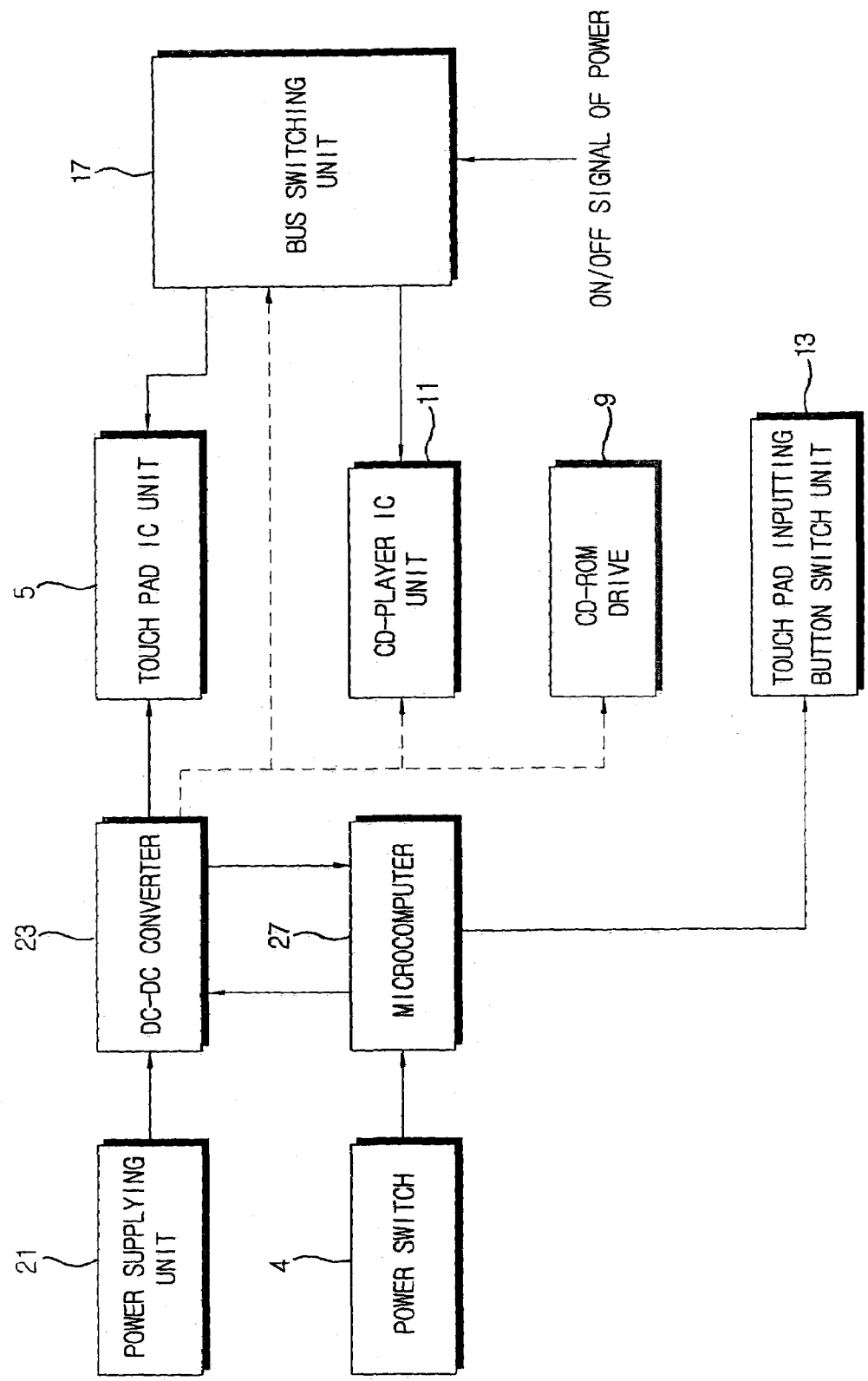
FIG. 2 is a block diagram showing a power control when a power switch of the portable computer shown in FIG. 1 is turned on or off.

FIG. 2 is a block diagram showing a power control while the power switch 4 of the portable computer according to the present invention is turned on and off. As shown in this figure, a power control block of the portable computer 1 capable of driving the CD player while the system power is turned off is comprised of a power supplying unit 21 supplying the power supplied from an adaptor or a battery, a DC-DC converter 23 converting the power supplied from the power supplying unit 21 into voltages in a variety of capacities (e.g., 1.5V, 3.3V, 4.5V and so on), a microcomputer 27 controlling the DC-DC converter 23 so as to turn on or off the power supplied to a CD player IC unit 11 and the touch pad IC unit 5, a CD player IC unit 11 operated with the power supplied from the DC-DC converter 23 when the touch pad inputting button 7 is selected while the power switch 4 is turned off, so as to process the audio data of the CD-ROM drive 9, and a bus switching unit 17 supplying the selected signal to either of the touch pad IC unit 5 or the CD player IC unit 11 depending upon whether the power switch 4 is turned on or off when the touch pad inputting button 7 is selected. Preferably, the touch pad inputting button switch unit 13 generating a selection signal when the touch pad inputting button 7 is pressed according to the present invention is operated with the power supplied from the driving power inputting pin of the microcomputer 27.

In response to the turning on or off of the power switch, the microcomputer 27 controls the DC-DC converter 23 so as to turn on or off the power supplied to the touch pad IC unit 5. If one of the buttons constituting the touch pad inputting button 7 is pressed while the power switch 4 is turned off, the computer system is designed so that the power is supplied to the CD player IC unit 11.

FIG. 3 is a switch circuit diagram to use the touch pad inputting button 7 of FIG. 1 as an inputting button of a control signal involved in reproduction of the CD-ROM drive 9. As depicted therein, the touch pad IC unit 5 processing a selection signal by the button 7 for scrolling and inputting the pointing cursor and the CD player IC unit 11 processing the reproduction signal and the volume control signal of the CD-ROM drive 9 are connected to the touch pad inputting button switch unit 13 through the bus switching unit 17. The touch pad inputting button switch unit 13 [is composed of] includes a plurality of contact switches generating a selected signal depending upon selection of respective buttons such as LEFT, RIGHT, LEFTWARD SCROLL, RIGHTWARD SCROLL, UP SCROLL and DOWN SCROLL constituting the touch pad inputting buttons 7.

The signal inputting pins provided in the CD player IC unit 11 and the touch pad IC unit 5 respectively are connected to the multiplicity of output ports A1 through A6 and B1 through B6 of the bus switching unit 17 through the resistances. Here, the resistances connected to the CD player IC unit 11 and the touch pad IC unit 5 receive the power respectively from the driving powers for the CD player IC unit 11 and the touch pad IC unit 5 and generate their signals.

The signal inputting pins of the CD player IC unit 11 are used to input functions of, for example, PLAY/PAUSE, STOP, FORWARD, PREVIOUS, VOLUME UP, VOLUME DOWN involved in reproduction of the CD-ROM drive 9.

The signal inputting pin of the touch pad IC unit 5 is used to input, for example, LEFT, RIGHT, LEFTWARD SCROLL, RIGHTWARD SCROLL, UP SCROLL, DOWN SCROLL.

The bus switching unit 17 connects input ports C1 through C6 of a selected signal generated in the touch pad inputting button switch unit 13 based on the "ON" selection signal of the power switch 4 to the output ports B1 through B6 connected to the touch pad IC unit 5, and connects the input ports C1 through C6 of a selected signal generated in the touch pad inputting button switch unit 13 based on the "OFF" selection signal of the power switch 4 to the output ports A1 through A6 connected to the CD player IC unit 11.

According to this, if the touch pad inputting button 7 is pressed while the power switch 4 is turned on, the selection signal generated in the touch pad inputting button switch unit 13 is applied to the touch pad IC unit 5. Conversely, if any one of the buttons constituting the touch pad inputting buttons 7 is pressed while the power switch 4 is turned off, a selection signal is applied to the reproduction control signal inputting pin of the CD player IC unit 11, thereby controlling the reproduction function thereof.

In the above embodiment, it has been described that, when the touch pad inputting button is selected, the selected signal is directly inputted into the relevant reproduction inputting pin of the CD player IC unit. However, this may be performed by the microcomputer programmed so as to allow the reproduction control signal to be applied to the CD player IC unit according to a sensed signal after sensing a selection by the touch pad inputting button.

In the above embodiment, it has been described that an inputting unit for driving the CD player is a touch pad inputting button. However, the microcomputer may be programmed so that the inputting function to drive the CD-ROM drive is established with a plurality of key buttons on the keyboard, the microcomputer senses when a key button is selected and the sensed signal is then supplied to the CD player IC unit.

The above embodiment has been described with respect only to the CD-ROM drive. However, it can also be applied to other optical devices, for example, a DVD drive.

With this configuration, in a portable computer equipped with an optical device IC processing the audio data inserted into a drive for the optical device while the power switch is turned off, the respective buttons of the touch pad provided in the computer body, that is, LEFT/RIGHT click buttons, and LEFTWARD/RIGHTWARD and UP/DOWN scroll buttons, are supplemented with functions of inputting reproduction of the optical device IC, PLAY/PAUSE, STOP, FORWARD, PREVIOUS, VOLUME UP and VOLUME DOWN so as to use the touch pad inputting buttons as audio reproduction inputting buttons while the system power is in an "off" state.

As described above, according to the present invention, there has been provided a portable computer wherein an inputting unit, for movement and selection of the pointing cursor when the optical device drive is operated while the power switch is turned off, can be utilized as a control button involved in reproduction of the optical device drive.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A portable computer, comprising:
   a power switch;
   an optical device drive;
   an audio signal processing unit processing the audio data of a disk inserted into the optical device drive; and
   a touch pad including a sensing plate and a plurality of touch pad inputting buttons for inputting movement and selection of a pointing cursor when the power switch is in an "ON" state,
   wherein the touch pad inputting buttons of the touch pad have selection inputting functions used to control a plurality of operations of the optical device drive when the power switch is in an "OFF" state,
   wherein the audio signal processing unit is supplied with assistant power while system power is turned off, and
   wherein the audio signal processing unit controls the optical device drive based on selections inputted using the touch pad inputting buttons.

2. The computer according to claim 1, wherein the touch pad inputting buttons further comprises:
   a plurality of inputting button switches generating selection signals when the respective touch pad inputting buttons are pressed, wherein
   the touch pad is provided with a touch pad IC unit generating a pointing signal in response to the selection signal as generated by the plurality of inputting button switches.

3. The computer according to claim 2, further comprising a bus switching unit supplying the selection signal as generated by the inputting button switches based on an "ON" or "OFF" signal of the power switch into either of the touch pad IC unit or the audio signal processing unit.

4. The computer according to claim 3, wherein the bus switching unit supplies the selection signal as generated in the inputting button switches based on the "ON" signal of the power switch to the touch pad IC unit.

5. The computer according to claim 3, wherein the bus switching unit supplies the selection signal as generated by the inputting button switches based on the "OFF" signal of the power switch to the audio signal processing unit.

6. The computer according to claim 3, further comprising a microcomputer to turn on or off power supplied to the touch pad IC unit based on the "ON" or "OFF" signal of the power switch.

7. The computer according to claim 6, wherein the microcomputer supplies the assistant power to the audio signal processing unit when the selection signal is generated by pressing at least one of the touchpad inputting buttons while the system power is turned off.

8. A computer having an optical device driver, comprising:
   a power switch to enable or disable system power;
   a touch pad including a plurality of touch pad input button switches to generate a signal based on a user input, a sensing plate to sense a contact position, and a touch pad control unit to control movement of a pointing cursor; and
   a bus switching unit to supply the signal to the optical device driver to control an optical device if the system power is disabled and to supply the signal to the touch pad control unit to control a pointing curser if the system power is enabled.

9. The computer of claim 8, further comprising:
   a plurality of touch pad input buttons to operate the plurality of input button switches.

10. The computer of claim 8, wherein the optical device driver controls a CD-ROM drive that plays audio compact discs (CDs).

11. The computer of claim 10, wherein the signal is used to input playback instructions for the audio CDs when the signal is supplied to the optical device driver.

12. The computer of claim 8, wherein the optical device driver controls a DVD drive that plays digital versatile discs (DVDs).

13. The computer of claim 12, wherein the signal is used to input playback instructions for the DVDs when the signal is supplied to the optical device driver.

14. A method, comprising:
   determining whether system power has been enabled or disabled via a power switch;
   generating a signal based on a user input via a touch pad, which includes a plurality of touch pad input button switches and a sensing plate; and
   supplying the signal to an optical device driver to control an optical device if the system power is disabled, and supplying the signal to a touch pad control unit to control movement of a pointing cursor if the system power is enabled.

15. The method of claim 14, wherein the optical device driver controls a CD-ROM drive that is capable of playing audio compact discs (CDs).

16. The method of claim 15, wherein the signal is used to input playback instructions for the audio CDs when the signal is supplied to the optical device driver.

17. The method of claim 14, wherein the optical device driver controls a DVD drive that is capable of playing digital versatile discs (DVDs).

18. The method of claim 17, wherein the signal is used to input playback instructions for the DVDs when the signal is supplied to the optical device driver.

19. A machine-readable storage medium that provides instructions, which, when executed by a machine, cause the machine to perform operations comprising:
   determining whether system power has been enabled or disabled via a power switch;
   generating a signal based on a user input via a touch pad, which includes a plurality of touch pad input button switches and a sensing plate; and
   supplying the signal to an optical device driver to control an optical device if the system power is disabled, and supplying the signal to a touch pad control unit to control movement of a pointing cursor if the system power is enabled.

20. The machine-readable storage medium of claim 19, wherein the optical device driver controls a CD-ROM drive to play audio compact discs (CDs).

21. The machine-readable storage medium of claim 20, wherein the signal used to input playback instructions for the audio CDs when the signal is supplied to the optical device driver.

* * * * *